US007930239B2

(12) United States Patent
Pierdinock et al.

(10) Patent No.: US 7,930,239 B2
(45) Date of Patent: *Apr. 19, 2011

(54) AUTOMATED ACTIONS BASED ON RESTRICTIONS

(75) Inventors: Michele Pierdinock, Hoboken, NJ (US); William McKinney, Westfield, NJ (US); Charles Smith, Hoboken, NJ (US); Simon Gershon, Merrick, NY (US); Adrian Feliciano, West Orange, NJ (US); Ann Harding, Maplewood, NJ (US); Donna Figlik, Chicago, IL (US); Lorraine Giordano, Hoboken, NJ (US); Amy Kandravy, Norwell, MA (US)

(73) Assignee: CheckFree Corporation, Norcross, GA (US)

( * ) Notice: Subject to any disclaimer, the term of this patent is extended or adjusted under 35 U.S.C. 154(b) by 95 days.

This patent is subject to a terminal disclaimer.

(21) Appl. No.: 12/503,570

(22) Filed: Jul. 15, 2009

(65) Prior Publication Data

US 2009/0287613 A1    Nov. 19, 2009

Related U.S. Application Data

(63) Continuation of application No. 11/146,015, filed on Jun. 7, 2005, now Pat. No. 7,636,686.

(51) Int. Cl.
*G06Q 40/00* (2006.01)
(52) U.S. Cl. ...................................................... 705/37
(58) Field of Classification Search ............... 705/35–37
See application file for complete search history.

(56) References Cited

U.S. PATENT DOCUMENTS

| 5,729,700 | A | 3/1998 | Melnikoff |
| 5,940,843 | A | 8/1999 | Zucknovich et al. |
| 6,601,044 | B1 | 7/2003 | Wallman |
| 6,820,069 | B1 | 11/2004 | Kogan et al. |
| 7,233,928 | B2 | 6/2007 | Huerta et al. |
| 7,249,080 | B1 * | 7/2007 | Hoffman et al. ............ 705/36 R |
| 7,376,615 | B2 * | 5/2008 | Brixius ......................... 705/37 |
| 7,379,910 | B2 * | 5/2008 | Abrahm et al. ................ 705/37 |
| 7,403,918 | B2 * | 7/2008 | Kochansky ................ 705/36 R |
| 7,636,686 | B2 * | 12/2009 | Pierdinock et al. ............ 705/37 |
| 7,657,474 | B1 * | 2/2010 | Dybala et al. .................. 705/35 |
| 7,797,217 | B2 * | 9/2010 | Rosen et al. .............. 705/36 R |
| 2002/0059107 | A1 | 5/2002 | Reich et al. |
| 2003/0105697 | A1 | 6/2003 | Griffin et al. |
| 2003/0154149 | A1 | 8/2003 | Gajendragadkar |
| 2003/0225662 | A1 | 12/2003 | Horan et al. |

(Continued)

OTHER PUBLICATIONS

"SEC Adopts Safe Harbor for Discretionary Investment Advisory Programs." Hedge Fund and Investment Managers Advisory. Apr. 28, 1997 <http://www.ssbb.com/hedge6.html>. 5 pages.

(Continued)

*Primary Examiner* — Narayanswamy Subramanian
(74) *Attorney, Agent, or Firm* — Sutherland Asbill & Brennan LLP

(57) ABSTRACT

A technique for resolving a violation of an investment account restriction is provided. The restriction is associated with the holding of one or more securities in an investment account. A restriction definition and an associated resolution rule are stored in a data repository. A received order to perform an investment account management action is processed to determine that performance of the action violates the stored restriction definition. The associated resolution rule is then retrieved based upon the determination and then executed. Indications of the determined violation and of the executed resolution rule are stored in the data repository.

20 Claims, 3 Drawing Sheets

U.S. PATENT DOCUMENTS

| | | | |
|---|---|---|---|
| 2003/0225663 A1* | 12/2003 | Horan et al. | 705/36 |
| 2003/0229559 A1* | 12/2003 | Panttaja et al. | 705/36 |
| 2004/0205018 A1* | 10/2004 | Degraaf et al. | 705/37 |
| 2004/0267655 A1* | 12/2004 | Davidowitz et al. | 705/37 |
| 2005/0038726 A1 | 2/2005 | Salomon et al. | |
| 2005/0044029 A1* | 2/2005 | Griffin et al. | 705/36 |
| 2005/0049954 A1 | 3/2005 | Graham et al. | |
| 2005/0055433 A1 | 3/2005 | Mathew et al. | |
| 2005/0246686 A1 | 11/2005 | Seshadri et al. | |
| 2005/0267835 A1 | 12/2005 | Condron et al. | |
| 2005/0273407 A1* | 12/2005 | Black et al. | 705/35 |
| 2005/0278340 A1 | 12/2005 | Rehberg et al. | |
| 2006/0212376 A1* | 9/2006 | Snyder et al. | 705/35 |
| 2007/0192223 A1 | 8/2007 | Cifrese et al. | |
| 2007/0226120 A1 | 9/2007 | Nanjundamoorthy | |
| 2008/0016010 A1 | 1/2008 | Nanjundamoorthy et al. | |
| 2009/0287613 A1* | 11/2009 | Pierdinock et al. | 705/36 R |
| 2010/0076896 A1* | 3/2010 | Lutnick et al. | 705/80 |

OTHER PUBLICATIONS

"Fidelity Portfolio Advisory Service—Frequently Asked Questions." Mar. 7, 2005 <https://scs.fidelity.com/products/wealth/content/faqprospects.html>. 6 pages.

* cited by examiner

AUTOMATED ACTIONS BASED ON RESTRICTIONS

RELATED APPLICATION

The present application is a continuation of U.S. patent application Ser. No. 11/146,015, filed on Jun. 7, 2005, and entitled "Automated Actions Based On Restrictions," which issued as U.S. Pat. No. 7,636,686 on Dec. 22, 2009. The foregoing application is incorporated by reference in its entirety.

TECHNICAL FIELD

The present invention relates to investment portfolio management and more particularly to automated processing of investment restrictions.

BACKGROUND ART

A money manager is an entity that manages an investment on behalf of an investor. An individual money manager has an investment style that reflects a particular investment philosophy. For example, a money manager's investment style might be large cap growth, large cap value, small cap, or fixed income. Of course, other investment styles are known. A money manager defines a style model that reflects his or her particular investment style. The investment is, accordingly, transacted in accordance with the style model. An individual money manager may have multiple investment styles. In such a case, that money manager is associated with multiple style models, each reflecting a different investment style.

A money manager often manages investment accounts for one or more clients. A client can be any of a number of different types of entities, including a sponsor; an individual broker or a brokerage firm, sometimes also known as a broker dealer (essentially synonymous with "sponsor"); an outsourcer; a holding company; or an investment manager. Thus, an investor may be several steps removed from the money manager managing the investor's investment. For example, the investor may work with a financial advisor who opens an account on the investor's behalf with a brokerage firm, perhaps through a broker. The brokerage firm in turn opens an account with the money manager. However, other times the financial advisor may manage the investment account directly, and thus act like a money manager. Such a situation is referred to as a "rep-as-manager" scenario. It should also be noted that a money manager (or entity performing the function of a money manager) may manage investment accounts associated with different programs offered to investors by a client. For example, one account might be part of a multi-strategy portfolio (MSP) program in which different portions of an investor's investment are managed by different money managers, while another account might be part of a "rep-as-manager" program. "Rep-as-manager" programs are typically created by a client (in this case, more specifically a sponsor or brokerage firm), as are many other programs. Other examples of programs include mutual fund programs, traditional wrap programs, and proprietary wrap programs. In addition, an investment account may be associated with a client's chosen "strategy", which could further be reflected in one or more programs that a client offers. A few examples of "strategy" include: "conservative", "aggressive", and "international".

As an example of a style model, a money manager could define an asset allocation for a style model as shown in Table 1 below.

TABLE 1

| ASSET | PROPORTION |
|---|---|
| IBM | 20% |
| CKFR | 10% |
| STSH | 30% |
| AOL | 10% |
| Cash | 30% |

For the exemplary asset allocation shown in Table 1, as an initial investment is received it is distributed in accordance with the style model. If the initial investment were $10,000, the investment would be distributed as shown in Table 2 below.

TABLE 2

| ASSET | HOLDING |
|---|---|
| IBM | $2,000 |
| CKFR | $1,000 |
| STSH | $3,000 |
| AOL | $1,000 |
| Cash | $3,000 |

Over time, due to account activity and other factors, the account typically will become either underweighted or overweighted in one or more assets. Either as an automatic function, or manually initiated, the account is rebalanced to bring it back in line with the style model. Rebalancing typically includes selling overweighted assets and purchasing underweighted assets. As will be understood by one of ordinary skill in the art, money managers typically utilize automated portfolio management systems in administering accounts. Thus, the money manager's automated portfolio management system will typically identify the need for rebalancing and identify the trades and other transactions necessary to rebalance the account.

Oftentimes restrictions are placed upon one or more accounts managed by a money manager. Some money managers allow an investor, perhaps through a client, to place one or more restrictions on the investor's individual account. Such a restriction is known as an account level restriction. Sometimes a money manager places one or more restrictions on the entire style model such that the restrictions apply to all individual accounts. Such a restriction is known as a style level restriction. It should be noted that, as allowed by a money manager, another entity might establish a style level restriction (e.g., a client). Also, some money managers facilitate program level restrictions, which apply to accounts associated with a particular program. Often, program level restrictions are established by a client and apply to accounts that are associated with that client and belong to a certain program. And, some money managers allow client level restrictions that apply to all accounts associated with a particular client. A restriction that applies to more than one account is said to apply to a trade block.

A restriction, no matter the level, typically affects "buy" and "sell" decisions. For example, a restriction might stipulate that no AOL stock be held in an account, or that CheckFree should never drop below ten percent of the total holdings of an account. A restriction may be established at any point in time: before an initial allocation of assets according to a style model, after an initial allocation, or even after one or more rebalancings.

Conventionally, during distribution of new investments and rebalancing of existing accounts the money manager portfolio management system will determine if any applicable restrictions exist. In the above example of a restriction against ownership of AOL stock, a restriction violation would be detected. This detected violation would then be flagged for review and resolution by a human operator. It should be noted that a violation may be flagged in the context of a single account, or a trade block. As will be appreciated, human review and resolution of violations is costly to the money manager both in terms of man-hours and monetary expense.

In the case of the restriction against ownership of AOL, an asset allocation as shown in Table 2 would produce a flagged restriction violation for human resolution. Conventionally, only three resolution options are available. A human operator must make the decision as to which of the three options to employ when resolving a flagged violation and must also oversee the execution of the chosen option.

As shown in Table 3, the first resolution option is known as a cash option. In the cash option the amount that is associated with the restriction, i.e., the $1,000 that would have been invested in AOL, is instead kept as cash.

TABLE 3

| ASSET | HOLDING |
|---|---|
| IBM | $2,000 |
| CKFR | $1,000 |
| STSH | $3,000 |
| AOL | $0 |
| Cash | $4,000 |

In the second option, as shown in Table 4 and known as the distribution option, the amount that is associated with the restriction is distributed across the non-restricted securities in the style model in accordance with the model proportions. Thus, in the present example, the amount that would have been invested in AOL is instead spread across IBM, CKFR, and STSH in a 2:1:3 ratio.

TABLE 4

| ASSET | HOLDING |
|---|---|
| IBM | $2,333 |
| CKFR | $1,167 |
| STSH | $3,500 |
| AOL | $0 |
| Cash | $3,000 |

In the third option, known as straight substitution, the amount that is associated with the restriction is invested in any one or more of the other securities in the style model, or even in another security not a part of the style model. Thus, as shown in Table 5, AOL could be replaced with EDS.

TABLE 5

| ASSET | HOLDING |
|---|---|
| IBM | $2,000 |
| CKFR | $1,000 |
| STSH | $3,000 |
| EDS | $1,000 |
| Cash | $3,000 |

With the currently available resolution options, there is no ability to distribute the amount associated with the restriction across only a portion of the remaining assets included in the style model. Thus, the human operator cannot distribute the restricted amount among those securities within a particular asset class, within a sector group, or within an issue type. Also with the currently available resolution options, there is no ability to distribute the amount associated with the restriction evenly across non-restricted securities, instead of distribution by ratio across non-restricted securities. Accordingly, existing techniques for resolution of a violation are constrained to a limited number of resolution options.

Problems with currently available portfolio management systems extend beyond addressing violations in the context of a single account to addressing violations involving trade blocks. Conventional portfolio management systems only have limited capability to apply a resolution to less than all accounts within a trade block. The only way to achieve a unique resolution in an account within a trade block conventionally is by applying one resolution uniformly across all accounts in the trade block, then subsequently manually overriding that resolution on an account-by-account basis for each account requiring, as desired, a different resolution.

Further, conventional resolution techniques only provide the cash and distribution options, described above, for resolving violations within a trade block. There is no ability to stipulate one security substitution for one account, and another security substitution for another account. Accordingly, there exists even more limited resolution options for an account that is a part of a trade block than for an individual account.

Finally, conventional portfolio management systems lack an audit trail of restriction violations and resolutions. Rather, there exists only a general tracking of any trades resulting from the manual resolution. Accordingly, there can be no monitoring or the effectiveness of restrictions and associated resolutions with currently available portfolio management systems.

OBJECTIVES OF THE INVENTION

It is an objective of the invention to overcome one or more of the above-described problems. Additional objects, advantages, novel features of the present invention will become apparent to those skilled in the art from this disclosure, including the following detailed description, as well as by practice of the invention. While the invention is described below with reference to preferred embodiment(s), it should be understood that the invention is not limited thereto. Those of ordinary skill in the art having access to the teachings herein will recognize additional implementations, modifications, and embodiments, as well as other fields of use, which are within the scope of the invention as disclosed and claimed herein and with respect to which the invention could be of significant utility.

SUMMARY DISCLOSURE OF THE INVENTION

In accordance with the present invention, a computerized method and a system for resolving a violation of an investment account restriction are provided. An investment account is associated with one or more investors and contains assets which can include, but are not limited to, cash and securities. An investment account restriction is a directive concerning those assets. Oftentimes a restriction directs that a certain asset not be held in the account. However, a restriction could also direct other aspects of an investment account's holdings. Such an aspect could be, but is not limited to, that an investment account always hold a certain asset, or that a certain amount of a particular asset always be held in an investment account. A violation of an investment account restriction can occur different ways. For example, a violation could develop over time as the values of various held assets fluctuate, or a violation could be the result of a trade or other transaction ordered by an entity managing an investment account. Of course, a violation could occur in a different manner.

The system includes at least a memory and a processor. The memory is configured to store information associated with restrictions and restriction resolutions. The memory could be any type of data repository capable of storing data. The processor is configured to implement the method as described herein and could be any type of processor capable of functioning to implement the method, including, but not limited to, a processor as found in a typical personal computer, mainframe computer, server-type computer, or any other type computing device.

A restriction definition and an associated resolution rule are stored. A resolution rule dictates an action to be taken to cure a violated restriction. Thus, information identifying an action to be taken upon the occurrence of a restriction violation is stored in association with information identifying the restriction.

In both the computerized method and system, an order is received to perform some management action associated with the investment account. This order could be received from any entity having authority to transact the investment account. A management action can be any type of action that has the potential to result in a change in the holdings of the assets of the investment account, such as, but not limited to, a purchase of one or more securities, a sale of one or more securities, or a rebalancing of the investment account.

A determination is made from a processing of the received order that performance of the action violates the stored restriction definition. As a result of this determination, the resolution rule associated with the restriction definition is retrieved from storage. The retrieved resolution rule is then executed in completing the action. Execution of the resolution rule may replace a portion of the action, may replace all of the action, or may simply supplement the action. An indication of the determined violation and an indication of the execution of the resolution rule is stored. Thus, occurrence of both the violation and the resolution is tracked.

In another aspect of the present invention, the stored restriction definition and the associated resolution rule pair are associated with either a single investment account, an investment style under which one or more investment accounts are transacted, an investment program with which one or more investment accounts are associated, or a client with which one or more investment accounts are associated.

According to another aspect of the present invention, the restriction definition prohibits a holding of a first security in an investment account, and the resolution rule specifies substituting a holding of a second security for a holding of the first security. Thus, one security is restricted from being held in the investment account, and another security is designated as a replacement security for the restricted security.

In a further aspect, the restriction definition is a first restriction definition and the resolution rule is a first resolution rule. A second restriction definition and associated second resolution rule are also stored. This second restriction definition prohibits a holding of the second security, and the second resolution rule specifies substituting a holding of a third security for a holding of the second security. A determination is made that executing the first resolution rule violates the stored second restriction definition, and as a result of this determination, the second resolution rule is retrieved from storage. The retrieved second resolution rule is then executed in completing the action. Thus, a resolution of a violation of the first restriction violates a second restriction, and accordingly the second resolution rule is executed.

According to another aspect of the present invention, upon completion of the action, an amount of a first security would be held. The stored restriction definition prohibits any holding of this first security. The associated resolution rule specifies substituting a holding of a second security for a first portion of the amount of the first security and substituting a holding of another asset for a second portion of the amount of the first security. The other assets could be one of cash or a third security. Thus, the resolution rule specifies more than a one-for-one replacement. Rather, a first portion of a restricted security is replaced with one asset, and second portion of the restricted security is replaced with another asset.

According to still another aspect of the present invention, the investment account is associated with a style model and the investment account management action is one of a plurality of investment account management actions. Information associated with each of the plurality of investment account management actions is stored. The stored action information is processed, other than any information associated with the one action, to determine a performance of the style model. Thus, the restriction violation will not affect the determination of the performance of the style mode.

In another aspect, the restriction definition prohibits a holding of a first security, and the resolution rule includes at least one criteria for determining one or more assets to substitute for a holding of the first security. Execution of the retrieved resolution rule includes determining the one or more assets for substitution. Thus, the assets for substitution may change from one execution of the rule to another.

According to yet another aspect of the invention, the restriction definition prohibits a holding of a first group of securities in an investment account, and the resolution rule specifies substituting a holding of a second group of securities for a holding of the first group of securities. The first group of securities belongs to either the same industry sector, the same issue type, or the same security rating. Similarly, the second group of securities belongs to either the same industry sector, the same issue type, or the same security rating. Thus, securities sharing at least one common trait are replaced with securities sharing at least one common trait.

In still another aspect of the present invention, the action is associated with a model that includes a group of securities. The model identifies a proportion of each security in the group. Thus, the model dictates how much of each security to hold. In this aspect, the restriction definition prohibits holding a first security. However, this first security is included in the group. The resolution rule specifies substituting a cash equivalent for the prohibited security across at least a portion of the other securities of the group in accordance with the model proportions.

According to yet another aspect of the present invention, the action is associated with a model that includes a group of securities. The model identifies a proportion of each security in the group. The restriction definition prohibits holding a first security. As with the above, aspect, this first security is included in the group. The resolution rule specifies substituting a cash equivalent for the prohibited security evenly across at least a portion of the other securities of the group. Thus, the model, in this aspect, does not control the substitution.

In still another aspect of the present invention, the action is associated with either a single investment account, or a group of investment accounts. Thus, the action is targeted to, or affects, either one or multiple investment accounts.

According to yet another aspect, the action is associated with a group of investment accounts, the resolution rule is a first resolution rule associated with a first one of the group of investment accounts, and executing the first resolution rule only affects the first investment account. A second resolution rule associated with the restriction definition is stored. This second resolution rule is associated with at least a second one of the group of investment accounts. The second resolution rule is retrieved based upon the determination, and is executed in completing the action.

In a different aspect of the present invention, the resolution rule is a first resolution rule, and at least a second resolution rule is stored in association with the restriction definition. The at least second resolution rule is retrieved based upon the determination. A determination is made that the retrieved first resolution rule has a highest priority among the retrieved resolution rules. Based upon this determined highest priority, only the first resolution rule is executed. Thus, the multiple resolution rules are prioritized, with the highest priority rule being executed. In a further aspect, each retrieved resolution rule is associated with a different entity and the priority is determined based upon the entity with which each resolution rule is associated.

BRIEF DESCRIPTION OF DRAWINGS

In order to facilitate a fuller understanding of the present invention, reference is now made to the appended drawings. These drawings should not be construed as limiting the present invention, but are intended to be exemplary only.

PREFERRED EMBODIMENT

Figure 1:
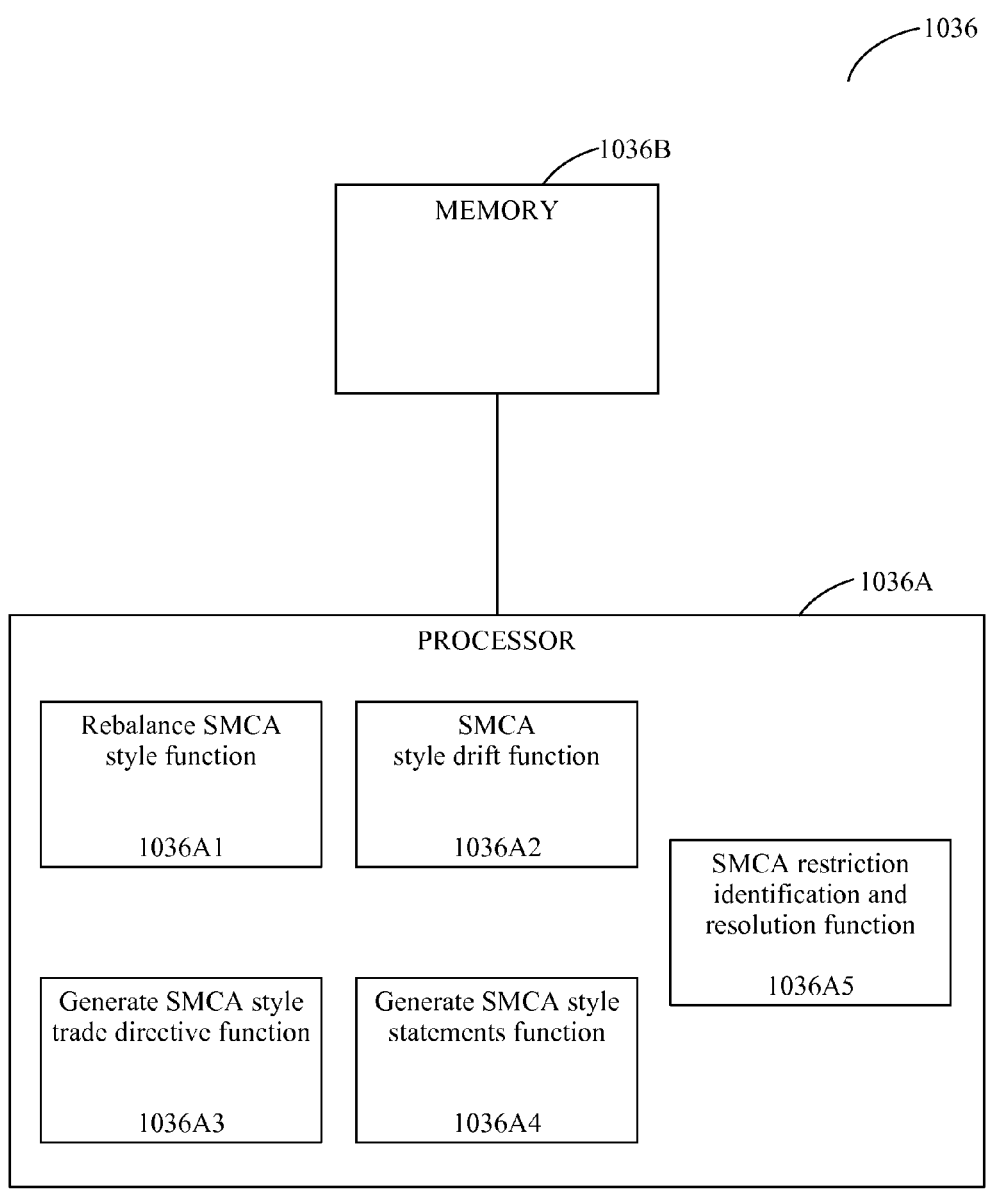
FIG. 1 is a simplified depiction of a money manager portfolio management system in accordance with certain aspects of the present invention.

FIG. 1 is an exemplary depiction of a money manager portfolio management system (MMPMS) 1036 in accordance with the present invention. As shown, the MMPMS 1036 includes a processor 1036A and memory 1036B. A style model (SM) is stored in the memory 1036B. The processor 1036A is configured (i.e. programmed) with the logic necessary to perform various functions.

As desired, the MMPMS 1036 may interface to systems associated with one or more brokers, brokerage firms, and/or investors, as well as other entities. Any interfacing may include synchronous or asynchronous communications. One or more tokens associated with the money manager could support both identity authentication and access control.

Introduced above, the MMPMS processor 1036A includes the logic, e.g. programmed instructions, necessary to perform various functions. As shown, these functions include an inventive SMCA restriction identification and resolution function 1036A5, to be discussed further below. Other conventional functions may, as desired, also be included. These functions may include, but are not limited to, a rebalance SMCA style function 1036A1, a SMCA style drift function 1036A2, a generate SMCA style trade directive function 1036A3, and a generate SMCA style statements function 1036A4.

As noted above, the MMPMS 1036 stores a style model in the memory 1036B for the investment style utilized by the money manager. Beneficially, the MMPMS 1036 could provide functions that relate to the building and maintenance of the style model. The MMPMS 1036 stores the applicable SM both to record modifications made by the applicable money manager, as well as to perform functions executable by the processor 1036A on a relevant portion, or all, of a single managed client account (SMCA). In one alternative, the financial advisor working directly with an investor and the investor could have a rep-as-manager relationship in which the financial advisor manages that investor's entire investment, and thus acts like a money manager. Alternatively, the money manger and the investor could have a more distant relationship, in that one or more other entities, such as a broker and/or brokerage firm are situated between that investor and the money manager. In this situation, the money manager may manage only a portion of the investor's account, or may manage the entire account. Additionally, it will be appreciated that the money manager will preferably manage, either entirely or partially, multiple SMCAs.

The memory 1036B also stores identifying information associated with the SMCA. This identifying information includes information identifying at least one of the investor and/or a client associated with the investor. The stored information also preferably includes information identifying any program with which the account is associated.

With regard to the rebalance SMCA style function 1036A1, the money manager may, as desired or necessary, rebalance the relevant portion of the single managed client account. This allows the money manager to bring the relevant portion of the single managed client account managed in accordance with that money manager's style back in line with the SM for that style. To do this, the processor 1036A executes the rebalance SMCA style function 1036A1 to determine the deviation of the relevant portion of the single managed client account from the SM stored in the memory 1036B. It then generates trade directives by executing the generate SMCA style trade directive function 1036A3 to reduce or eliminate the determined deviation and thereby place the relevant portion of the single managed client account in line with the applicable SM.

Drift within the relevant portion of the single managed client account is monitored and managed by executing the SMCA style drift function 1036A2. The execution of this function by the MMPMS processor 1036A allows the monitoring and managing of drift within the relevant portion of the single managed client account in an automated manner. More particularly, by executing the drift function 1036A2, the MMPMS 1036 is able to identify whether a security or other holding in the relevant portion of the single managed client account has drifted outside of a range from a position for that security or holding included in the SM or in other data stored in the memory 1036B, or otherwise identified. For example, the range may be established in real time by the processor 1036A if so desired. In any event, the processor 1036A then executes the generate SMCA style trade directive function 1036A3 to initiate trade directives in order to reduce or eliminate the drift, and thereby place the relevant portion of the single managed client account in line with the applicable SM.

The SMCA restriction identification and resolution function 1036A5 is a fully automated function that may be, as desired, invoked based upon occurrence of one or more events, including completion of one or more other functions, invoked at a particular time, or invoked on an ad hoc basis. The SMCA restriction identification and resolution function 1036A5 leverages data stored in the memory 1036B. The stored data, for each restriction, includes a restriction definition and a restriction violation resolution. This information will often be referred to herein as a restriction definition/violation resolution pair. As discussed above, a restriction can be associated with an individual account, a style, a program, a client, or a strategy. Restriction data may be received from an individual investor, or an entity associated with the investor, such as a financial advisor, broker, brokerage firm, or the money manager. As will be understood, often a financial advisor and a broker are the same entity. It should also be pointed out that an account could be subject to multiple restrictions, perhaps instituted at different levels, i.e., at the individual account level, at the style level, at the program level, or at the client level.

A restriction definition includes a restriction identifier and information identifying a restriction level, e.g., account level, style level, program level, a strategy and client level, a subject asset, e.g., cash or a particular stock, and attributes of the restriction. If the restriction is an account level restriction, the definition also identifies the account (and thus indirectly the investor) and optionally other identifying information specific to that particular restriction, such as, for example, the entity making the restriction. The scope of effect of an account level restriction would be only the identified account. If the restriction is a style level restriction, the definition identifies the particular style model and optionally other identifying information specific to that particular restriction, such as, for example, the entity making the restriction. The scope of effect of a style level restriction would be all accounts associated with the identified style. If the restriction is a program level restriction, the definition identifies at least the restricted program, and optionally other identifying information specific to that particular restriction, such as, for example, the client making the restriction. The scope of effect of a program level restriction would be all accounts associated with the identified program. If the restriction is a client level restriction, the definition identifies the client. The scope of effect of a client level restriction would be all accounts associated with the identified client. Note that, while these specific four levels are contemplated, it is not necessary that all four levels be supported, and other levels are possible and would be treated similarly.

A restriction could be, but is not limited to, a prohibition against any holding of the subject asset, information identifying a minimum or maximum holding of the subject asset, and/or information identifying a target transaction price of the subject asset such that the subject asset is either sold or purchased based upon the target transaction price. Of course, other restrictions could be, as desired, identified in the attributes.

Note that a restriction could be defined for a particular time period only. Furthermore, a restriction can be defined as a "hard" restriction or a "soft" restriction. A "hard" restriction must be followed, without exception, and thus particularly lends itself to fully automated violation detection and resolution processing, as described herein. A "soft" restriction can be overridden by entities with appropriate authority, A restriction violation resolution identifies activities to be performed in resolution of the identified restriction violation. If restriction violation resolution data is not received from the entity defining the resolution, the money manager will determine the stored restriction violation resolution One particular type of restriction violation resolution is stipulation of a security substitution. In its simplest form, an entity could designate a one-for-one substitution. However, as desired, a security substitution could be more sophisticated. Sophisticated substitutions available through the MMPMS 1036 include a chain of substitutions, an n-for-1 substitution, a group substitution, and a non-specific substitution.

In a chain of substitutions a first definition/violation resolution pair stipulates a substitution of a first security (security A) with a second security (security B), and a second restriction definition/violation resolution pair calls for a substitution of security B with a third security (security C). Thus, if a style model includes security A, security A will be replaced with security C. The different definition/violation resolution pairs could be each associated with a different restriction level. Also, it should be noted that a chain of substitutions could be any number of pairs deep. In execution, a chain of substitutions could be treated as a single block, with only the final link being executed, or individual links of the chain could execute in series.

In an n-for-1 substitution the substitution replaces a restricted security with two or more different securities. As an example, a definition/violation resolution pair could require that securities B and C replace security A. Further, a percentage of the replacement securities may be, as desired, identified, i.e., 60% security B and 40% security C. A money manager could limit the number of replacement securities, i.e., a maximum of three substitutions for a single restricted security might be allowed. Also, one of the replacements in an n-for-1 substitution could be cash. This supports simultaneously buying into a security and depositing in cash in lieu of buying into a restricted security.

A group substitution identifies a group of securities for replacement with another group of securities. For example, a definition/violation resolution pair could require that all securities of a particular industry sector be replaced with securities from another industry sector, i.e., replace all utility securities with biotechnology securities. Groups may be defined in many different ways in addition to industry sector, including, but not limited to, issue type and security rating. Preferably, the money manager will define the group types available for selection by the entity establishing the restriction definition/violation resolution pair.

A non-specific substitution is dynamic at the time of execution. Instead of substituting a specific, well defined security, the security to be substituted is determined at the time of substitution based upon the function of some defined rule. For example, the rule could stipulate "buy into the most underweighted security included in the style model", or "sell from the most overweighted security". Alternatively, the rule could stipulate "buy into the most underweighted group" or "sell from the most overweighted group", with the sum going into or coming out of the group either in accordance with model proportions or evenly. This type of substitution is advantageous in the context of specific trades and "what if" analysis. However, it may be less relevant in the context of new undesignated investments and rebalancing.

Another type of automated restriction violation resolution is a stipulation that the amount associated with a restriction should be kept as cash. Unlike conventional money manager portfolio management systems, the MMPMS 1036 of the present invention can execute such without intervention of a human operator, as well as at the behest of an entity other than a money manager.

Still another type of automated restriction violation resolution is a stipulation that the amount associated with a restriction should be distributed across unrestricted securities included in the style in some particular manner. In addition to a simple distribution in accordance with the style model proportions, also available is a distribution across some subset of securities held in the style model, which itself could be either in accordance with what the style model dictates for that subset, evenly, or otherwise. The subset could be, as desired, a group as discussed above. And, also available is an even distribution across multiple unrestricted securities in the style model such that equal portions of the restricted amount are distributed to each of the multiple unrestricted securities. It should be noted that the multiple unrestricted securities could be all, or less than all, the unrestricted securities in the style model.

The MMPMS 1036 is configured to identify restriction violations in both an individual account as well as in a trade block. Different than the prior art, the MMPMS 1036 includes the functionality to resolve a trade block restriction violation on an account-by-account basis. The restriction violation resolution portion of a restriction definition/violation resolution pair for a trade block may, as desired, identify unique resolutions for one or more accounts included in the trade block. For example, a particular trade block violates a restriction on a first security (security A). A first account that is a part of the trade block has a resolution that substitutes a second security (security B) for security A, while a second account that is a part of the trade block has a resolution that substitutes a third security (security C) for security A. Further, one or more of the remaining accounts that are a part of the trade block may have a resolution that stipulates keeping the amount associated with security A as cash, while still others of the accounts of the trade block may have a resolution that stipulate distributing the amount associated with security A across the remaining securities of the style model.

Introduced above, a restriction definition/violation resolution pair may be established at any of the available levels. In this embodiment, this includes the following four, although there could be fewer or more: client, program, style, or account. Thus, it is possible that multiple restriction definition/violation resolution pairs may apply to any single account or trade block, as discussed above in relation to the chain of substitutions. Further, it is even possible that multiple restriction definition/violation resolution pairs may apply to the same asset. Because of this, restriction definition/violation resolution pairs are prioritized according to level, with chain substitutions being an exception that allows different rules to both take effect together.

Figure 3:
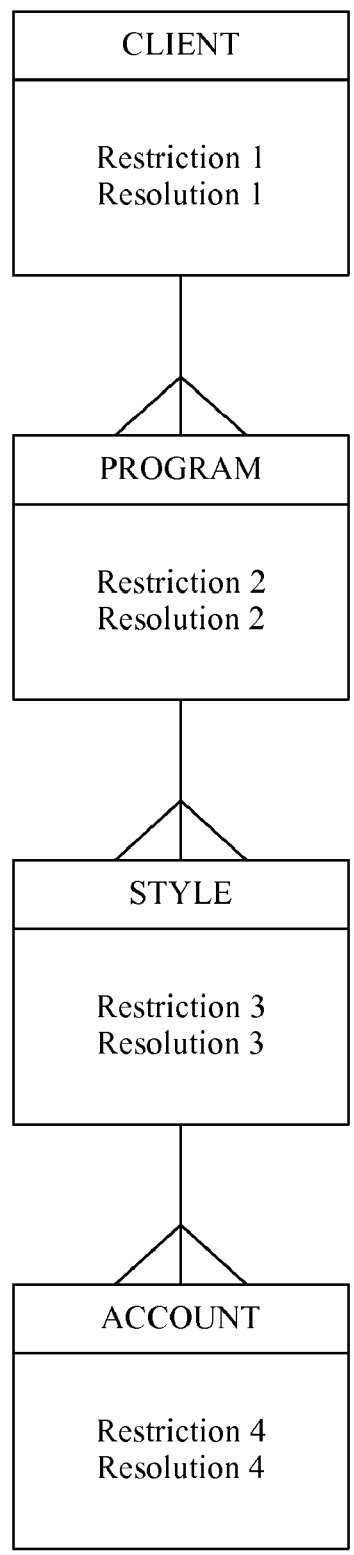
FIG. 3 is a simplified data entity relationship diagram depicting a hierarchy between different levels of restriction in accordance with certain aspects of the present invention.

FIG. 3 is a data entity relationship diagram depicting the hierarchy between restriction levels. A typical prioritization scheme is to apply restriction definition/violation resolution pairs in reverse order of the hierarchy shown in FIG. 3. In such a scenario, account level restrictions override other level restrictions, followed by style level restrictions, then program level restrictions, and finally client level restrictions. Of course, as desired, the levels could be ordered differently.

The MMPMS 1036 detects when multiple restriction definition/violation resolution pairs conflict, i.e., apply to the same asset. If an account level restriction conflicts with any other level restriction, the MMPMS 1036 executes the violation resolution associated with account level restriction, if a style level restriction conflicts with either a program or client level restriction, the MMPMS 1036 executes the violation associated with the style level restriction, and so on.

The MMPMS 1036 tracks the occurrence of restriction violations and resolutions. Whenever a restriction violation is detected, the MMPMS 1036 stores information associated with that detection in memory 1036B, sometimes referred to as tracking data. This stored information includes the restriction identifier, level of the restriction (i.e., account, style, program, or client), a user identifier, if performing a manual override, a timestamp of the identification and/or resolution, any and all actions taken to resolve the violation, the reason for the action(s) taken, i.e., dictated by a stored violation resolution, and an identification of any trading tool used in the resolution. Also, an identifier of a user who triggered an automated restriction and resolution can, as desired, be stored. The generate SMCA style statements function 1036A4 is executed by the processor 1036A to generate a statement for the portion of the investor's account managed in accordance with the SM stored in the memory 1036B of the MMPMS 1036.

The generate SMCA style statements function 1036A4 also produces reports, based upon the stored information associated with a violation and resolution. These reports may be by category such that actions resulting from standard rebalancing and trades can be separated from actions taken to resolve restriction violations. The stored violation and resolution information can be included in any report as detailed information for use by a human reviewer in responding to questions posed during auditing. The reports may also be used for trend analysis such that over time reports can identify frequency patterns of certain restriction violations occurring or certain violation resolutions being executed. Also, the SMCA style statements function 10036A4 produces performance reports reflecting the performance of the style over time. The stored violation and resolution information is used to exclude violations and resolutions from the style performance reports.

Figure 2:
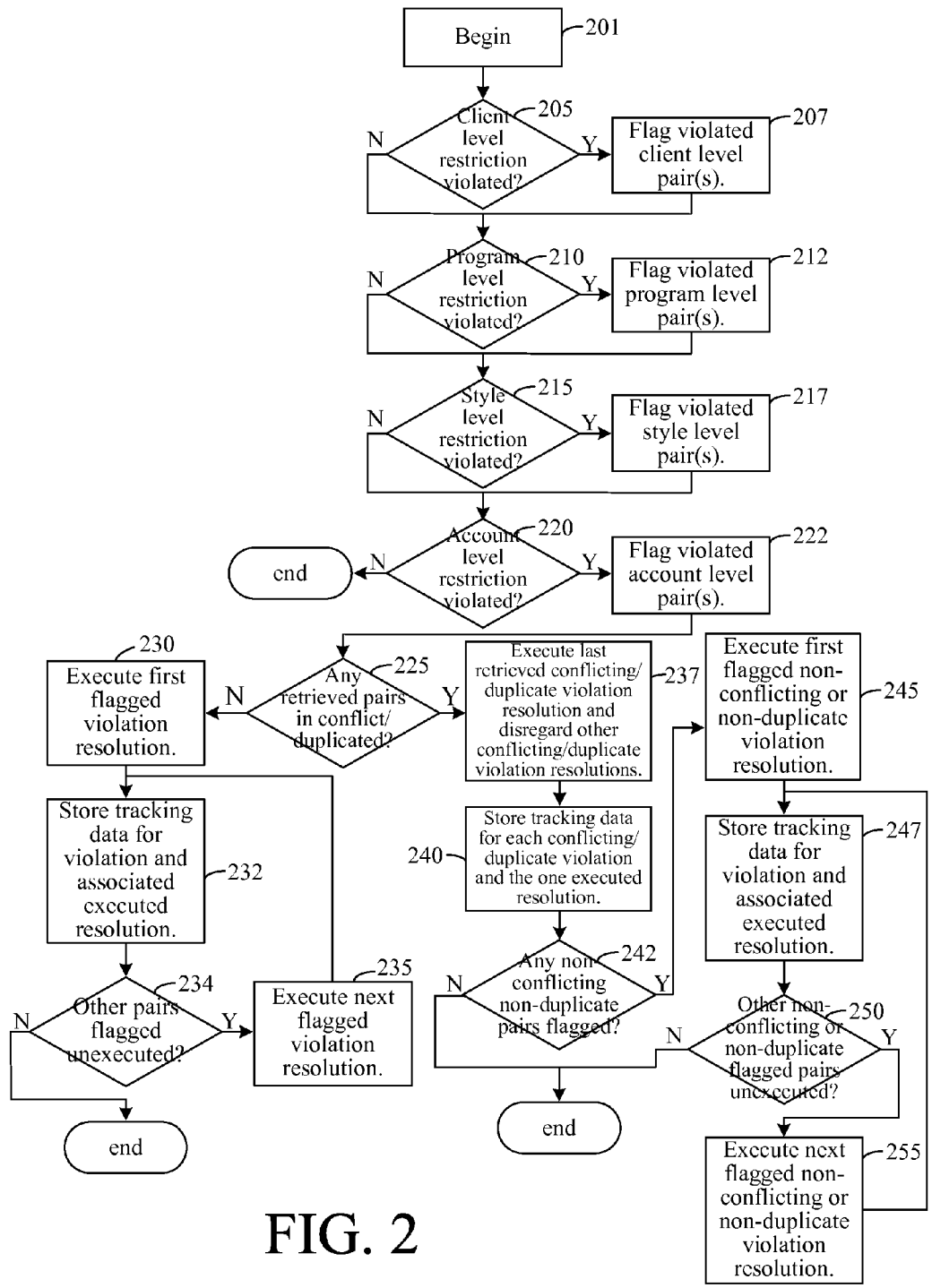
FIG. 2 depicts exemplary processing performed in accordance with certain aspects of the present invention.

FIG. 2 is a simplified exemplary depiction of processing performed during execution of the SMCA restriction identification and resolution function 1036A5 for a particular SMCA. The example of FIG. 2 assumes that chains of substitutions are not included in restriction types. At step 201 the processor 1036A begins execution of the function. At step 205 the processor 1036A determines, based upon the stored SMCA identifying information and the stored restriction definitions, if the SMCA is subject to any client level restrictions. If not, operations continue with step 210. If the SMCA is subject to one or more client level restrictions, at step 207 those client level restriction definition/violation resolution pairs are flagged for later processing and operations continue with step 210.

At step 210 the processor 1036A determines, based upon the stored SMCA identifying information and restriction definitions, if the SMCA is subject to any program level restrictions. If not, operations continue with step 215. If the SMCA is subject to one or more program level restrictions, at step 212 those program level restriction definition/violation resolution pairs are flagged for later processing and operations continue with step 215.

At step 215 the processor 1036A determines, based upon the stored SMCA identifying information and restriction definitions, if the SMCA is subject to any style level restrictions. If not, operations continue with step 220. If the SMCA is subject to one or more style level restrictions, at step 217 those style level restriction definition/violation resolution pairs are flagged for later processing and operations continue with step 220.

At step 220 the processor 1036A determines, based upon the stored SMCA identifying information and restriction definitions, if the SMCA is subject to any account level restrictions. If not, operations end. If the SMCA is subject to one or more account level restrictions, at step 222 those account level restriction definition/violation resolution pairs are flagged for later processing and operations continue with step 225.

At step 225 the processor 1036A determines if there is a conflict between retrieved restriction definition/violation resolution pairs, or if there is duplication among retrieved restriction definition/violation resolution pairs. Obviously, if only one restriction definition/violation resolution pair has been retrieved, the determination in step 225 will be negative. However, if multiple pairs have been retrieved, the processor 1036A determines if the same subject asset is identified in two or more pairs. If so, a conflict or duplication is identified, and operations continue with step 237. If the determination in step 225 is negative, operations continue with step 230.

At step 230 the processor 1037A executes the first flagged violation resolution. Following execution of the first flagged violation execution, operations continue with step 232 in which the processor 1036A stores in memory 1036B the tracking information associated with the detected violation and executed resolution, discussed above. Then, at step 234 the processor 1036A determines if any other flagged pairs remain unexecuted. If not, operations end. If so, operations continue with step 235 in which the next flagged violation resolution is executed. When all flagged violation resolutions have been retrieved, and appropriate tracking data has been stored, operations end.

If in step 225 the determination is positive, operations continue with step 237 in which the processor 1036A executes the last flagged conflicting or duplicate violation resolution and discards the remaining conflicting or duplicate flagged restriction definition/violation resolution pair(s). At step 240 the processor 1036A stores in the memory 1036B tracking information associated with each identified conflicting or duplicate restriction violation and the one executed violation. The processor 1036A then determines if any non-conflicting or non-duplicate restriction definition/violation resolution pairs have been flagged, step 242. If not, operations end. This effectively implements a prioritization that puts account level rules at the top, and client level rules at the bottom. As will be appreciated, a different prioritization could, as desired, be implemented.

If the determination of step 242 is positive, operations continue with step 245 in which the processor 1036A executes the first flagged non-conflicting or non-duplicate violation resolution. Following execution of the first flagged non-conflicting or non-duplicate violation execution, operations continue with step 247 in which the processor 1036A stores in memory 1036B the tracking information associated with the detected violation and executed resolution. Then, at step 250 the processor 1036A determines if any other flagged non-conflicting or non-duplicate pairs remain unexecuted. If not, operations end. If so, operations continue with step 255 in which the next flagged non-conflicting or non-duplicate violation resolution is executed. When all flagged non-conflicting or non-duplicate violation resolutions have been executed, and appropriate tracking data has been stored, operations end.

While this invention has been described in the context of functionality within a money manager portfolio system supporting a money manager, it should be noted that this functionality could be triggered by or available to another entity's (e.g., a client's) portfolio management system.

The present invention is not to be limited in scope by the specific embodiments described herein. Indeed, various modifications of the present invention in addition to those described herein will be apparent to those of skill in the art from the foregoing description and accompanying drawings. Thus, such modifications are intended to fall within the scope of the appended claims.

We claim:

1. A computer-implemented method, comprising:
    storing a restriction definition and an associated resolution rule, wherein the restriction definition specifies a constraint regarding a first asset, and wherein the resolution rule specifies criteria for dynamically determining, at a time of execution of the resolution rule, at least one second asset to substitute for the first asset;
    receiving an order to perform an action for an investment account, wherein the action involves the first asset;
    processing the received order to determine that performance of the action violates the stored restriction definition;
    responsive to determining that performance of the action violates the stored restriction definition, performing a first execution of the resolution rule to dynamically determine the at least one second asset to substitute for the first asset in accordance with the specified criteria, wherein the at least one second asset is not specifically identified by the resolution rule prior to execution of the resolution rule; and
    substituting the at least one second asset for the first asset in performing the action for the investment account,
    wherein the prior steps are performed by one or more computers of a portfolio management system.

2. The computer-implemented method of claim 1, wherein the stored restriction definition prohibits a holding of the first asset in the investment account.

3. The computer-implemented method of claim 1, further comprising:
    receiving a second order to perform a second action for the investment account, wherein the second action involves the first asset;
    processing the received second order to determine that performance of the second action violates the stored restriction definition; and
    responsive to determining that performance of the second action violates the stored restriction definition, performing a second execution of the resolution rule to dynamically determine at least one second asset to substitute for the first asset in accordance with the specified criteria,
    wherein the at least one second asset determined during the second execution of the resolution rule is different, at least in part, than the at least one second asset determined during the first execution of the resolution rule.

4. The computer-implemented method of claim 1, wherein the first asset comprises a first security, and wherein the at least one second asset comprises (i) a second security or (ii) a group of second securities.

5. The computer-implemented method of claim 1, wherein the second asset comprises a group of securities, and wherein an amount going into or coming out of the group of securities is distributed across the securities in the group either evenly or in accordance with a model proportion.

6. The computer-implemented method of claim 5, wherein the group of second securities is defined according to industry sector, issue type, or security rating.

7. The computer-implemented method of claim 1, wherein the criteria for dynamically determining the at least one second asset comprises identifying an overweighted or underweighted security or group of securities in the investment account.

8. The computer-implemented method of claim 7, wherein the overweighted or underweighted security or group of securities is determined according to one or more style models associated with the investment account.

9. The computer-implemented method of claim 1, wherein the action is performed by buying or selling the at least one second asset.

10. The computer-implemented method of claim 1, wherein the action comprises a trade or "what if" analysis.

11. A system, comprising:
    a memory configured to store a restriction definition and an associated resolution rule, wherein the restriction definition specifies a constraint regarding a first asset, and wherein the resolution rule specifies criteria for dynamically determining, at a time of execution of the resolution rule, at least one second asset to substitute for the first asset; and a processor configured to access the memory, wherein the processor is configured to:
  receive an order to perform an action for an investment account, wherein the action involves the first asset,
  process the received order to determine that performance of the action violates the stored restriction definition,
  responsive to determining that performance of the action violates the stored restriction definition, perform a first execution of the resolution rule to dynamically determine the at least one second asset to substitute for the first asset in accordance with the specified criteria, wherein the at least one second asset is not specifically identified by the resolution rule prior to execution of the resolution rule, and
  substitute the at least one second asset for the first asset in performing the action for the investment account.

12. The system of claim 11, wherein the stored restriction definition prohibits a holding of the first asset in the investment account.

13. The system of claim 11, wherein the processor is further configured to:
  receive a second order to perform a second action for the investment account, wherein the second action involves the first asset;
  processing the received second order to determine that performance of the second action violates the stored restriction definition; and
  responsive to determining that performance of the second action violates the stored restriction definition, perform a second execution of the resolution rule to dynamically determine at least one second asset to substitute for the first asset in accordance with the specified criteria,
  wherein the at least one second asset determined during the second execution of the resolution rule is different, at least in part, than the at least one second asset determined during the first execution of the resolution rule.

14. The system of claim 11, wherein the first asset comprises a first security, and wherein the at least one second asset comprises (i) a second security or (ii) a group of second securities.

15. The system of claim 11, wherein the second asset comprises a group of securities, and wherein an amount going into or coming out of the group of securities is distributed across the securities in the group either evenly or in accordance with a model proportion.

16. The system of claim 15, wherein the group of second securities is defined according to industry sector, issue type, or security rating.

17. The system of claim 11, wherein the criteria for dynamically determining the at least one second asset comprises identifying an overweighted or underweighted security or group of securities in the investment account.

18. The system of claim 17, wherein the overweighted or underweighted security or group of securities is determined according to one or more style models associated with the investment account.

19. The system of claim 11, wherein the action is performed by buying or selling the at least one second asset.

20. The system of claim 11, wherein the action comprises a trade or "what if" analysis.

* * * * *